United States Patent
Cho et al.

(10) Patent No.: US 10,276,209 B2
(45) Date of Patent: Apr. 30, 2019

(54) GENERATING AND DISPLAY OF HIGHLIGHT VIDEO ASSOCIATED WITH SOURCE CONTENTS

(71) Applicant: Samsung Electronics Co., Ltd., Suwon-si (KR)

(72) Inventors: Ik Hwan Cho, Suwon-si (KR); Jung Ki Min, Suwon-si (KR); Sang Mi Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/996,009

(22) Filed: Jan. 14, 2016

(65) Prior Publication Data

US 2016/0203841 A1   Jul. 14, 2016

(30) Foreign Application Priority Data

Jan. 14, 2015  (KR) .................. 10-2015-0006710

(51) Int. Cl.
| | |
|---|---|
| *G11B 27/034* | (2006.01) |
| *G11B 27/10* | (2006.01) |
| *G11B 27/031* | (2006.01) |
| *G11B 27/28* | (2006.01) |
| *G11B 27/34* | (2006.01) |

(52) U.S. Cl.
CPC .......... *G11B 27/034* (2013.01); *G11B 27/031* (2013.01); *G11B 27/107* (2013.01); *G11B 27/28* (2013.01); *G11B 27/34* (2013.01)

(58) Field of Classification Search
CPC ....... G11B 27/34; G11B 27/31; G11B 27/107; G11B 27/28

USPC .............. 386/230, 235, 239, 248, 278, 279; 715/719, 730, 731, 847
See application file for complete search history.

(56) References Cited

U.S. PATENT DOCUMENTS

| | | | |
|---|---|---|---|
| 8,296,797 B2 | 10/2012 | Olstad et al. | |
| 9,083,933 B2 | 7/2015 | Sato et al. | |
| 9,122,754 B2 | 9/2015 | Olstad et al. | |
| 2006/0034585 A1* | 2/2006 | Terada ................. | G11B 27/034 386/241 |

(Continued)

FOREIGN PATENT DOCUMENTS

| | | |
|---|---|---|
| EP | 1162844 A2 | 12/2001 |
| KR | 20060011324 | 3/2006 |

(Continued)

OTHER PUBLICATIONS

Extended European Search Report for Appln No. 16151099.5 dated Jun. 15, 2016.

(Continued)

*Primary Examiner* — Mishawn N Hunter
(74) *Attorney, Agent, or Firm* — Jefferson IP Law, LLP

(57) ABSTRACT

An electronic device is provided. The electronic device includes a processor and a memory, wherein the memory includes instructions that, when executed by the processor, cause the electronic device to perform obtaining an image for generating an edited video from a plurality of contents, generating matching information between the edited video and the plurality of contents, and generating the edited video based on the obtained image and the matching information. The matching information includes information of at least one of a source file, time, or location associated with the obtained image.

11 Claims, 14 Drawing Sheets

(56) References Cited

U.S. PATENT DOCUMENTS

| | | |
|---|---|---|
| 2006/0120624 A1 | 6/2006 | Jojic et al. |
| 2007/0053654 A1* | 3/2007 | Kikuchi ............ G11B 20/00086 386/235 |
| 2008/0097970 A1 | 4/2008 | Olstad et al. |
| 2009/0022474 A1* | 1/2009 | Kubono ................ G11B 27/105 386/279 |
| 2009/0080853 A1 | 3/2009 | Chen et al. |
| 2009/0094360 A1* | 4/2009 | Moorer ............... H04L 12/1822 709/224 |
| 2010/0077003 A1* | 3/2010 | Kondo ............. G06F 17/30256 707/780 |
| 2011/0026898 A1* | 2/2011 | Lussier ................ G11B 27/034 386/280 |
| 2011/0038550 A1* | 2/2011 | Obrador ........... G06F 17/30274 382/225 |
| 2012/0166953 A1* | 6/2012 | Affronti ............... G06Q 10/101 715/730 |
| 2013/0028571 A1 | 1/2013 | Sato et al. |
| 2013/0132374 A1 | 5/2013 | Olstad et al. |
| 2013/0268898 A1* | 10/2013 | Miki ........................ H04N 5/76 715/847 |
| 2013/0304820 A1* | 11/2013 | Vasquez .................. H04L 67/00 709/204 |
| 2015/0058733 A1* | 2/2015 | Novikoff .............. G11B 27/031 715/723 |
| 2015/0082172 A1* | 3/2015 | Shakib ............. G06F 17/30256 715/719 |
| 2015/0104144 A1* | 4/2015 | Minemura .......... H04L 65/1069 386/230 |
| 2015/0199727 A1* | 7/2015 | Naveh .................... G06Q 50/01 705/14.66 |
| 2015/0331930 A1* | 11/2015 | Xing ................. G06F 17/30598 707/723 |

FOREIGN PATENT DOCUMENTS

| | | |
|---|---|---|
| KR | 20100137990 | 12/2010 |
| WO | 2014179749 A1 | 11/2014 |

OTHER PUBLICATIONS

European Office Action dated Jan. 2, 2019, issued in European Patent Application No. 16151099.5.

\* cited by examiner

GENERATING AND DISPLAY OF HIGHLIGHT VIDEO ASSOCIATED WITH SOURCE CONTENTS

RELATED APPLICATION(S)

This application claims the benefit under 35 U.S.C. § 119(a) of a Korean patent application filed on Jan. 14, 2015 in the Korean Intellectual Property Office and assigned Serial number 10-2015-0006710, the entire disclosure of which is hereby incorporated by reference.

BACKGROUND

The present disclosure relates to a technology for generating and playing an edited video using a plurality of pieces of source content.

Various electronic devices having camera functions are being released. Camera functions may be provided to not only existing camera devices but also wearable devices such as smartphones or smartwatches. As various electronic devices having camera functions are widely used, users may more frequently acquire images or videos.

Meanwhile, users may also edit acquired images or videos into a video using an electronic device. For example, a user may make a video album by collecting pictures acquired while the user was travelling around a certain region for a month, or may collect wedding preparation pictures or pictures of a baby acquired between the baby's birth and the 100th day after the baby's birth and may edit the collected pictures into a highlight video.

However, existing methods for generating or playing edited videos do not efficiently provide information of source content. For example, existing methods do not allow for access to source content used for generating edited videos. In particular, when the source content is stored in an electronic device that is different from an electronic device used for generating the edited video, direct access to external content from the edited video is not allowed.

Furthermore, an existing video editing method merely provides a technique of editing a video using a plurality of images or a technique of extracting a specified area from a video. Moreover, when the edited video is played, information of an acquisition time, an acquisition place (a location where images and/or videos were originally acquired), or the like of a source image corresponding to a playback time cannot be provided.

SUMMARY

In accordance with an aspect of the present disclosure, an electronic device is provided. The electronic device includes a processor and a memory, wherein the memory includes instructions that, when executed by the processor, cause the electronic device to perform obtaining an image for generating an edited video from a plurality of contents, generating matching information between the edited video and the plurality of contents, and generating the edited video based on the obtained image and the matching information. The matching information includes information of at least one of a source file, a time, or a location associated with the obtained image.

DETAILED DESCRIPTION

Figure 1:
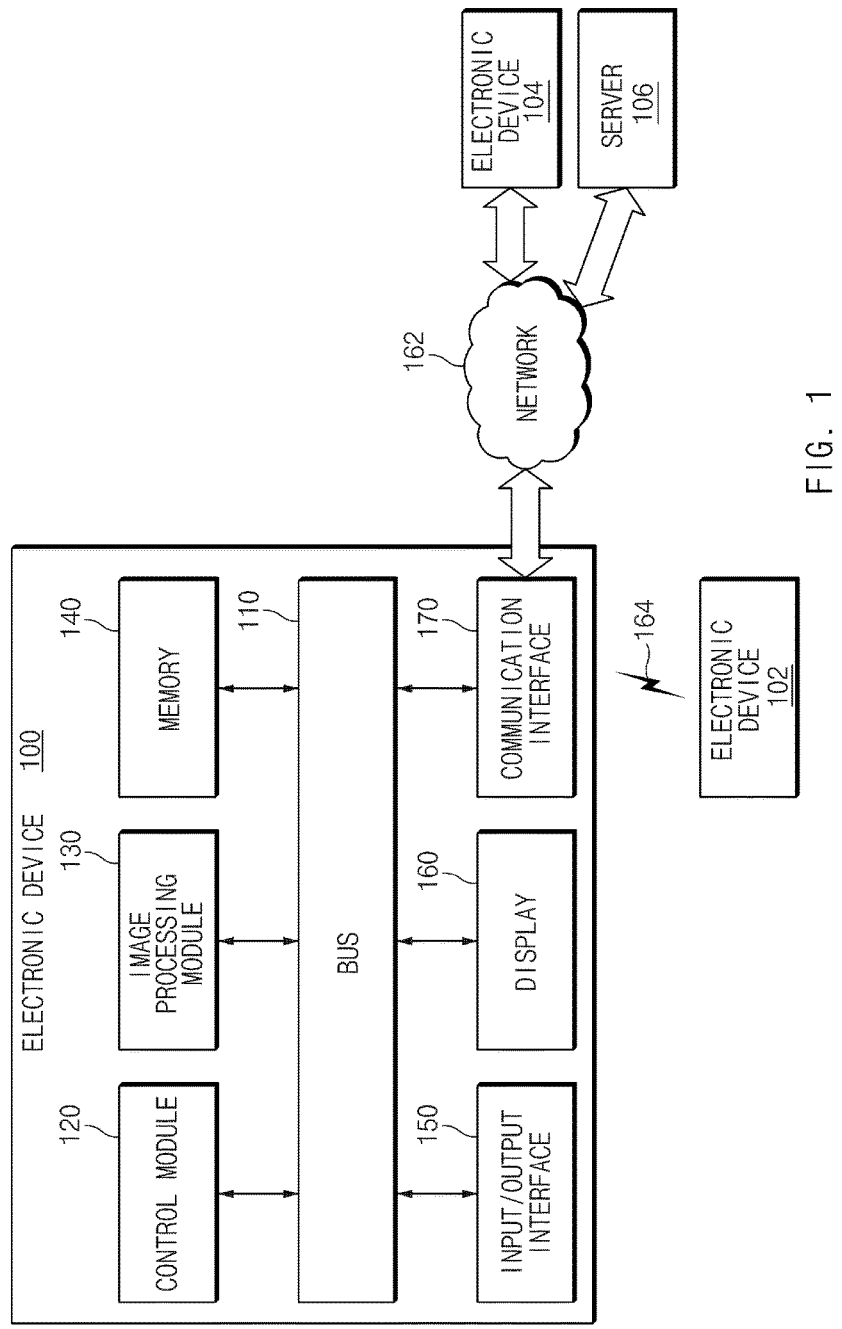
FIG. 1 illustrates an electronic device according to various embodiments of the present disclosure.

Hereinafter, various embodiments of the present disclosure will be described in detail with reference to the accompanying drawings. However, it should be understood that the present disclosure is not limited to specific embodiments, but rather includes various modifications, equivalents and/or alternatives of various embodiments of the present disclosure. Regarding description of the drawings, like reference numerals may refer to like elements.

FIG. 1 illustrates an electronic device according to various embodiments of the present disclosure.

An electronic device 100 according to various embodiments of the present disclosure will be described with reference to FIG. 1. The electronic device 100 may include a bus 110, a control module 120, an image processing module 130, a memory 140, an input/output interface 150, a display 160, and a communication interface 170. In some various embodiments of the present disclosure, at least one of the foregoing elements may be optional or other elements may be implemented in the electronic device 100.

The bus 110 may include a circuit to connect the control module 120 with the image processing module 130, the memory 140, the input/output interface 150, the display 160, and the communication interface 170, and for communications (e.g., control messages and/or data) between the above-mentioned elements.

The control module 120 may include at least one of a central processing unit (CPU), an application processor (AP), or a communication processor (CP). The control module 120 may perform data processing or an operation for communication and/or control of one or more of the bus 110, the image processing module 130, the memory 140, the input/output interface 150, the display 160, and the communication interface 170 of the electronic device 100. In various embodiments of the present disclosure, the control module 120 and the image processing module 130 may be construed as one processor (e.g., a system on chip (SoC)) or may be construed as different processors (e.g., a CPU and a GPU).

The image processing module 130 may generate an edited video (e.g., a highlight video) using a plurality of contents (e.g., images and/or videos) generated in the electronic device 100 or obtained from a server 106, the first electronic device 102, and/or the second electronic device 104. Furthermore, the image processing module 130 may support playback of an edited video generated by the electronic device 100 or another device. The image processing module 130 may also provide information of source content (e.g., display on the display 160 information of a date or a place at which the source content was generated or acquired) based on a specified condition or information while the edited video is played. Operation of the image processing module 130 will be described in detail with reference to FIG. 2.

The memory 140 may include a volatile memory and/or a nonvolatile memory. The memory 140 may store instructions or data related to at least one of the bus 110, the image processing module 130, the input/output interface 150, the display 160, and the communication interface 170 of the electronic device 100. In various embodiments of the present disclosure, a plurality of pieces of source content or at least a portion of the plurality of pieces of source content may be stored in the memory 140, while other contents may be stored in the first electronic device 102, the second electronic device 104, or the server 106. In some various embodiments of the present disclosure, an edited video may be stored in the memory 140, and source content may be stored in other external devices different from the electronic device 100. Furthermore, in some various embodiments of the present disclosure, at least a portion of the edited videos received from a website, a service, a server, etc. accessed by the electronic device 100 through the communication interface 170 may be buffered in the memory 140.

The input/output interface 150 may serve to transfer an instruction or data input from a user or a different external device to other element(s) of the electronic device 100. Furthermore, the input/output interface 150 may output an instruction or data received from other element(s) of the electronic device 100 to the user or another external device. In various embodiments of the present disclosure, the input/output interface 150 may receive a user input for displaying source content while an edited video is played, or may receive a user input for resuming a playback of the edited video while the source content is played or displayed.

The display 160 may include, for example, a liquid crystal display (LCD), a light-emitting diode (LED) display, an organic light-emitting diode (OLED) display, a microelectromechanical systems (MEMS) display, or an electronic paper display. The display 160 may display various kinds of content (e.g., a text, an image, a video, an icon, a symbol, or the like) to the user. The display 160 may also include a touchscreen (not shown), and may receive a touch, gesture, proximity or hovering input from an electronic pen or a part of a body of the user.

The communication interface 170 may interface communications between the electronic device 100 and, for example, the first electronic device 102, the second electronic device 104, and/or the server 106. For example, the electronic device 100 may be connected to a network 162 wirelessly or by wire via the communication interface 170 so as to communicate with the second electronic device 104 and/or the server 106.

The types of the first electronic device 102 and the second electronic device 104 may be the same as or different from the type of the electronic device 100. According to an embodiment of the present disclosure, the server 106 may include a group of one or more servers. According to various embodiments of the present disclosure, the server 106 may correspond to various types of servers such as a server for providing a social network service (e.g., Facebook, Google+, etc.) or a content providing server (e.g., YouTube, etc.).

Figure 2:
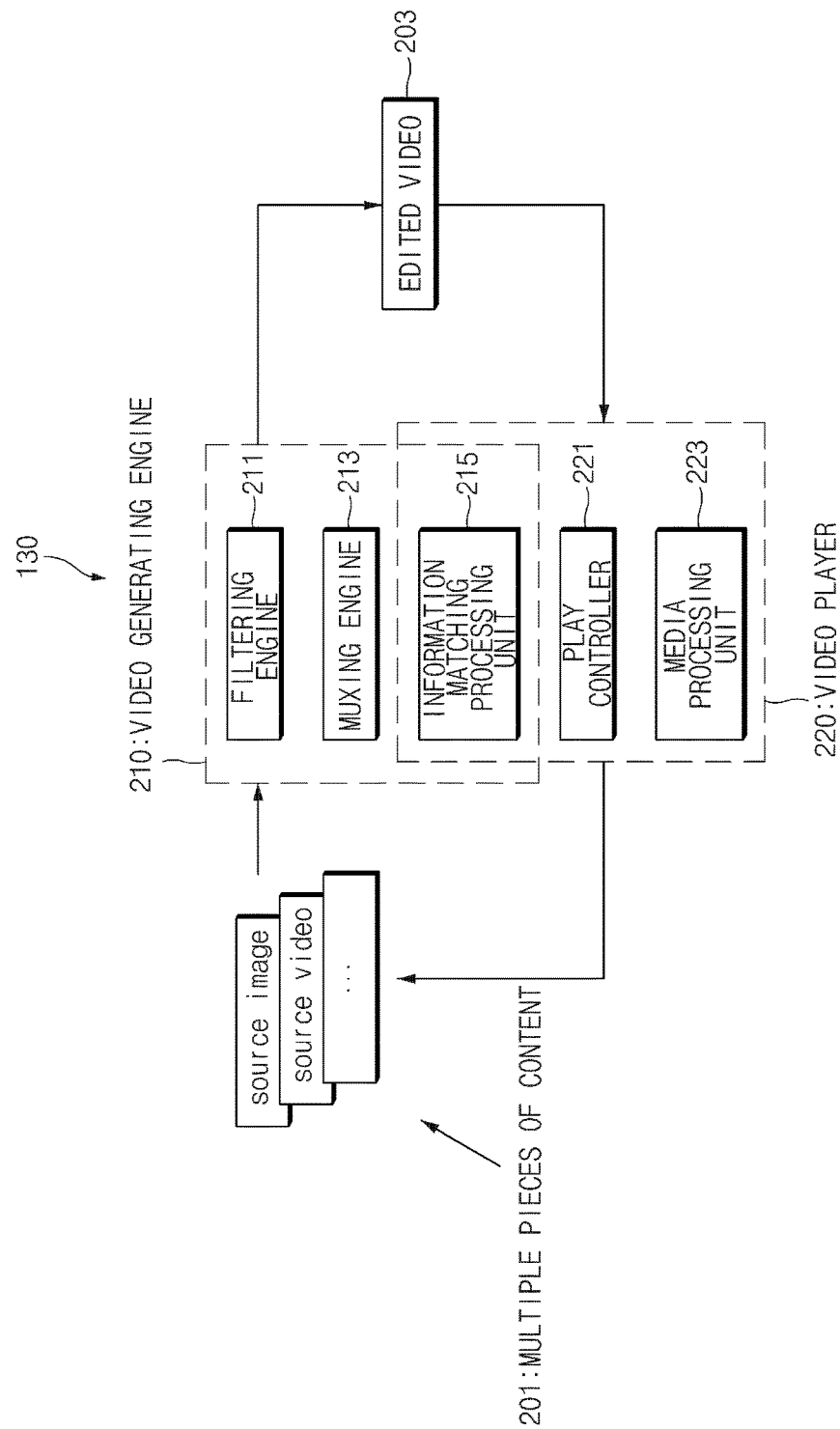
FIG. 2 illustrates a configuration of an image processing module according to various embodiments of the present disclosure.

FIG. 2 illustrates a configuration of the image processing module 130 according to various embodiments of the present disclosure.

Referring to FIG. 2, the image processing module 130 may include a filtering engine 211, a multiplexing engine 213, a information matching processing unit 215, a play controller 221, and a media processing unit 223.

In various embodiments of the present disclosure, the filtering engine 211, the multiplexing engine 213, and the information matching processing unit 215 may constitute a video generating engine 210. The electronic device 100 may generate an edited video 203 from a plurality of pieces of source content 201 using the video generating engine 210.

The filtering engine 211 may check quality, duplication or near-duplication, or the like of a plurality of source images and/or source videos, and may remove one or more images and/or videos therefrom. Furthermore, the filtering engine 211 may distinguish a desired image through face/object recognition and/or classification. For example, when the source content includes a plurality of similar images (e.g., images generated through continuous acquisitions), the filtering engine 211 may select images considered to be desired, excluding duplicate images, out-of-focus images, or images from which any object or face is not recognized. For example, when the source content includes a video, the filtering engine 211 may select important frames by analyzing frames of the video. For example, the filtering engine 211 may extract an I-frame from a plurality of frames of the video, and may perform filtering on the I-frame in a manner equal to or corresponding to that for an image to thereby select a frame that satisfies a specified condition. The filtering engine 211 may use the I-frame selected in this manner and a frame dependent on the I-frame (e.g., a P-frame or a B-frame) to generate the edited video 203. In various embodiments of the present disclosure, the filtering engine 211 may use the I-frame or some of the I-frame and the P-/B-frames to generate the edited video 203.

The multiplexing engine 213 may generate the edited video 203 by multiplexing images (or frames) selected by the filtering engine 211.

The information matching processing unit 215 may match information between the edited video 203 and the source content 201 to generate matching information. For example, the information matching processing unit 215 may extract information from metadata such as image acquisition information (e.g., exchangeable image file format (EXIF)) of a source image. For example, the information matching processing unit 215 may extract, from a source image (e.g., an image B) selected as a frame (e.g., an image A) forming the edited video 203, information such as an acquisition time or an acquisition place of the image or a file name, a storage location, a size, a resolution, etc. of a corresponding image file. As described below, if the frame (e.g., the image A) is played while the edited video 203 is played, the information matching processing unit 215 may allow information such as the acquisition time of the source image (e.g., the image B) corresponding to the frame to be provided. Operation of the information matching processing unit 215 will be described in detail with reference to the examples of FIGS. 3 to 5.

In various embodiments of the present disclosure, the play controller 221, the media processing unit 223, and the information matching processing unit 215 may constitute a video player 220. The electronic device 100 may play the edited video 203 using the video player 220, and may provide information of source content associated with the edited video 203.

In various embodiments of the present disclosure, the various elements of the image processing module 130 illustrated in FIG. 2 are merely examples and the names of the elements should not be construed as limiting the functions of the elements. For example, the image processing module 130 may include the video generating engine 210 and the video player 220, and the respective elements thereof may be construed as performing the above-mentioned functions. In another example, the image processing module 130 may be construed as a module capable of performing all of the above-mentioned functions without being divided into submodules.

In various embodiments of the present disclosure, the play controller 221 may play the edited video 203. If the edited video 203 is played, the play controller 221 may provide information of the source content 201 associated with the edited video 203 according to a defined condition. For example, when the edited video 203 is played, the play controller 221 may cause a display to display a file name, an acquisition time, an acquisition place, etc. of the source content corresponding to a playback time. Furthermore, in various embodiments of the present disclosure, when the edited video 203 is played, the play controller 221 may pause the edited video 203 or may provide (e.g., display or play) the source content 201 or information OF the source content 201 while maintaining a playback state of the edited video 203, if a specified event occurs. In this case, the play controller 221 may send a command or request related to the source content to the media processing unit 223.

The media processing unit 233 may access source content stored locally (e.g., in the memory 140) of the electronic device 100 or remotely (e.g., in the first electronic device 102, the second electronic device 104, or the server 106) from the electronic device 100. For example, if an event that causes playback of the source content 201 occurs while the edited video 203 is played, the media processing unit 223 may check information of the source content by referring to matching information (e.g., information generated by the information matching processing unit 215 or included in a data header of the edited video 203), and may output the source content 201 to the display 160 of the electronic device 100.

A method for generating the edited video 203 in the electronic device 100 will be described with reference to FIGS. 3 to 6, and various examples in which the electronic device 100 plays the edited video 203 and provides the source content 201 associated with the edited video 203 will be described with reference to FIGS. 7 to 12.

Figure 3:
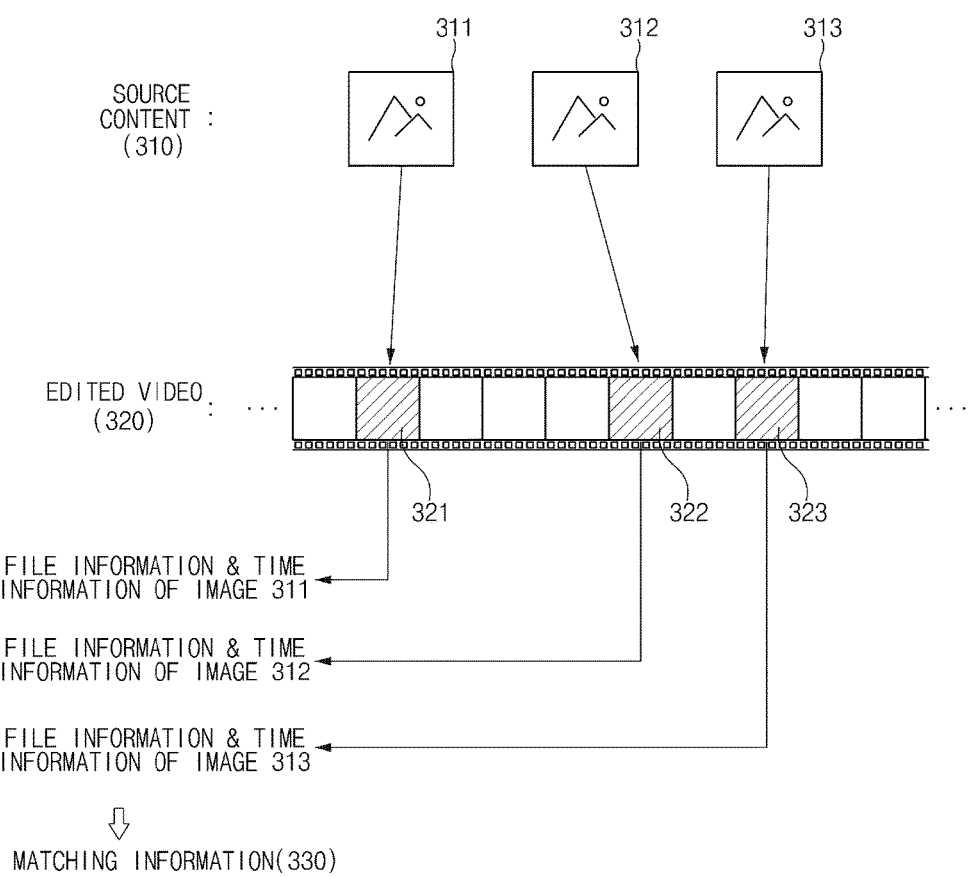
FIG. 3 illustrates an example of generating an edited video from a source image according to various embodiments of the present disclosure.

FIG. 3 illustrates an example of generating an edited video from a source image according to various embodiments of the present disclosure.

Referring to FIG. 3, source content 310 may include image 311, image 312, and image 313. For example, the source content 310 may be images acquired by a user of the electronic device 100 while the user travels around a specific area (e.g., France) or images stored in a specific folder or classified by a specific tag.

The electronic device 100 may generate an edited video 320 using the source content 310. For example, the electronic device 100 may dispose the image 311 in frame 321 of the edited video, may dispose the image 312 in frame 322, and may dispose the image 313 in frame 323. In the example illustrated in FIG. 3, three frames exist between frame 321 and frame 322 and one frame exists between frame 322 and frame 323. However, this is merely an example for providing a description with ease, and various numbers of frames may exist according to a method of generating the edited video 320. For example, various effects such as magnification, reduction, color tone change, or movement of the image 311 may be added so that a relatively large number of frames may exist between frame 321 and frame 322.

The electronic device 100 may obtain information associated with a source image corresponding to a frame of the edited video 320 to configure matching information 330. For example, the electronic device 100 may obtain from the image 311 information of file (e.g., a logical address at which the image 311 is stored, a file size of the image 311, a file extension or a resolution of the image 311, etc.) corresponding to the frame 321 of the edited video 320, from the image 311 information of time (e.g., a time at which the image 311 was acquired), etc. Although not shown in FIG. 3, information of a place where the image 311 was acquired, information of a device used to acquire the image 311, or information of exposure, white balance, focus, or the like may be further added. In various embodiments of the present disclosure, the electronic device 100 may obtain information obtainable from a file corresponding to the source content 310, additional information (e.g., metadata information) of the source content 310, and the source content 310.

In various embodiments of the present disclosure, the electronic device 100 may generate an edited video file as described below. For example, the electronic device 100 may generate edited video data using the source content 310, may configure the matching information 330 between a generated edited video and the source content, and then may store the matching information 330 in a header area of a file and may store the edited video data in a data area of the file. In some various embodiments of the present disclosure, the electronic device 100 may store the matching information 330 in an arbitrary reserved area.

Figure 4:
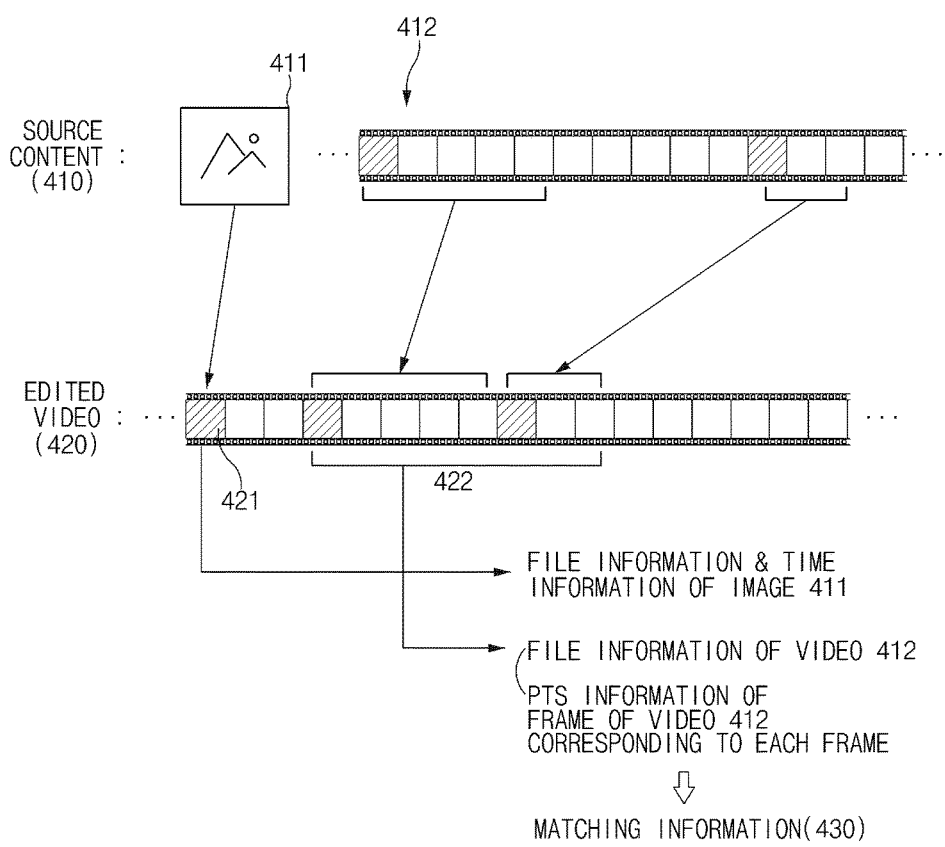
FIG. 4 illustrates an example of generating an edited video from source content including a video according to various embodiments of the present disclosure.

FIG. 4 illustrates an example of generating an edited video from source content including a video according to various embodiments of the present disclosure. Although an image 411 and a video 412 are used as source content 410 in the example of FIG. 4, an edited video 420 may be generated using a plurality of videos. That is, in various embodiments of the present disclosure, the electronic device 100 may generate an edited video using a plurality of images, a plurality of videos, or at least one an image and a video as a plurality of pieces of source content. Descriptions that are similar or correspond to or overlap with the above descriptions of FIG. 3 may not be provided below.

In various embodiments of the present disclosure, the electronic device 100 may generate a frame 421 (and a dependent frame using the frame 421 as a key frame) of the edited video 420 using the image 411. Furthermore, the electronic device 100 may generate frames 422 of the edited video using the video 412. For example, the electronic device 100 may configure consecutive frames 422 using two different playback areas of the video 412.

In various embodiments of the present disclosure, the electronic device 100 may generate at least a portion of the edited video 420 from the video 412 in various ways. For example, the electronic device 100 may extract all key frames, for example, I-frames (e.g., images/frames corresponding to the shaded areas of FIG. 3 or FIG. 4), included in the video 412, may select meaningful images by removing, from the frames extracted from the video 412, duplicate images or images from which an object or a face is not recognized according to a specified condition, and may use the selected images to generate the edited video 420. In this case, a dependent frame (e.g., the P-frame) of a finally selected I-frame may be added to the edited video 420 together with the selected I-frame. In some various embodiments of the present disclosure, a playback interval specified by user's selection may be added to the edited video 420. Furthermore, the electronic device 100 may use not only the above-mentioned method of extracting I-frames but also a method of selecting important frames according to various conditions.

In various embodiments of the present disclosure, the electronic device 100 may match information between the edited video 420 and the source content 410 to configure or generate matching information 430. For example, for the frame 421 of the edited video 420, the electronic device 100 may add, to the matching information 430, information of the image 411 corresponding to the frame 421 in the same manner as described above with reference to FIG. 3. Furthermore, the electronic device 100 may add, to the matching information 430, presentation time stamp (PTS) information of the video 412 corresponding to the frame 422. For example, a frame of the source content corresponding to a frame played at 00:00:05 PTS in the edited video may be played at 00:03:10 PTS in the source content. The matching information 430 may include PTS information for the edited video and the source content respectively with respect to frames corresponding to each other. The electronic device 100 may refer to the matching information 430 so as to provide information of time at which a currently output image (or frame) is played in the source video, while playing the edited video 420. Furthermore, as described above with reference to FIG. 3, with respect to the video 412, various information such as a file size, a duration, a resolution, an acquisition time, or an acquisition place of the video or a coded used for the video 412, etc. may be obtained.

An exemplary structure of the matching information 330 or 430 will be described with reference to FIG. 5.

Figure 5:
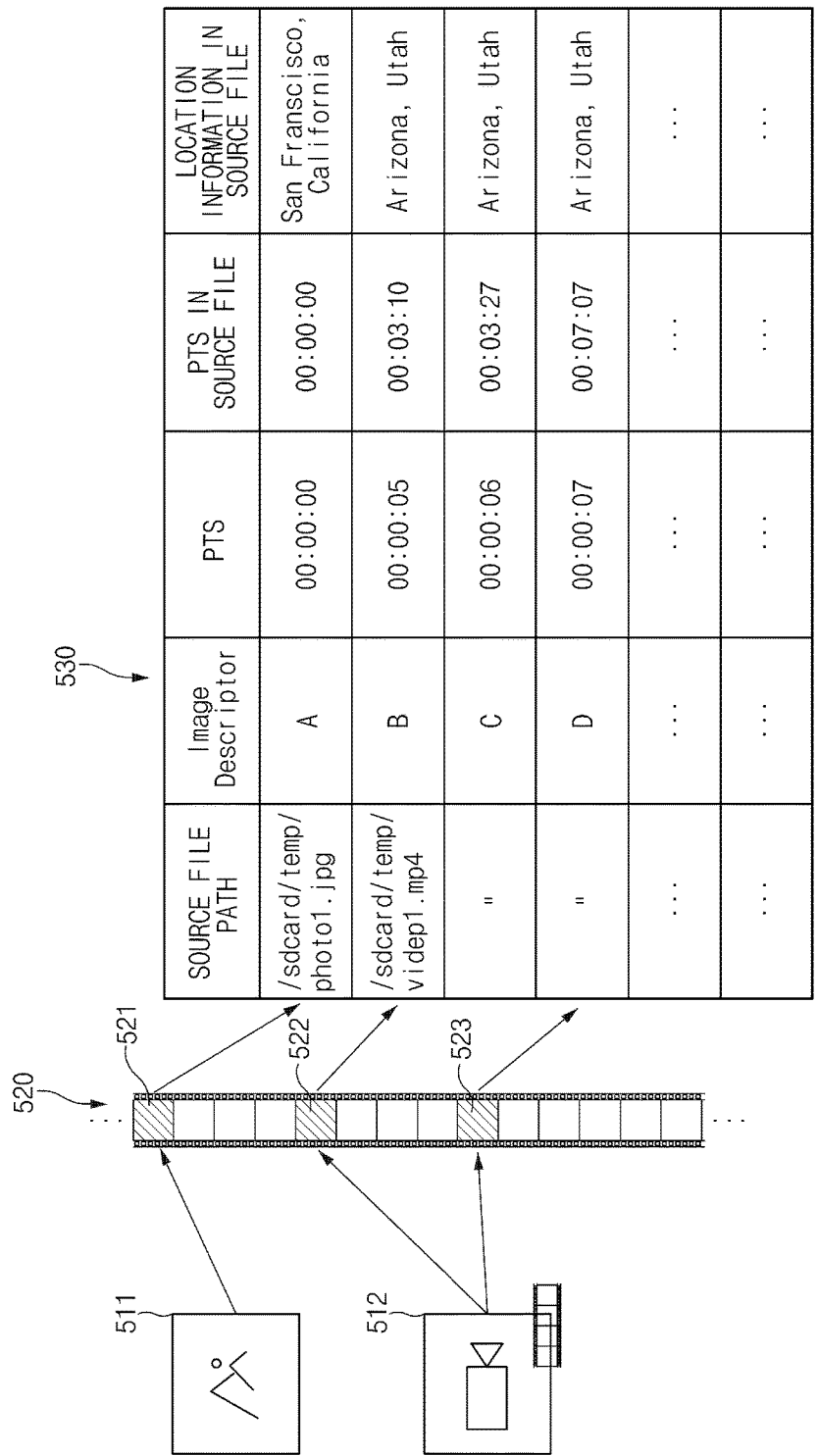
FIG. 5 conceptually illustrates a structure of matching information according to various embodiments of the present disclosure.

FIG. 5 conceptually illustrates a structure of matching information according to various embodiments of the present disclosure.

FIG. 5 illustrates matching information 530 of an edited video 520 generated using a source image 511 and a source video 512. In the example of FIG. 5, the source image 511 may correspond to frame 521 of the edited video 520. Furthermore, frames extracted from the source video 512 may respectively correspond to frame 522 and frame 523 of the edited video 520. Here, the frame 522 and the frame 523 may be at least one frame corresponding to at least a partial interval of the source video 512.

The matching information 530 may include information of source content corresponding to the frame 521 of the edited video 520. For example, the matching information 530 may include information of a source file (e.g., a file path such as /sdcard/temp/photo1.jpg) of the source image 511 corresponding to the frame 521, an image descriptor, the PTS in the edited video 520, the PTS in the source content, information of a location (e.g., "San Francisco, Calif.", global positioning system (GPS) coordinates, etc.) of a source file, or the like. According to the type of the source content, some matching information values may be empty or may be treated as a default value (e.g., 0 or 1). For example, in the case of the frame 521, since the source content is an image file, the PTS for the source content may not have a value or may be set as a specified value (e.g., 0 or 00:00:00).

Likewise, the matching information 530 may include information of the source video 512 corresponding to the frame 522 and the frame 523. When source content of frames (e.g., the frame 522 and frame 523) is the same, some of pieces of the matching information 530 may have the same value. For example, source file paths corresponding to the frame 522 and the frame 523 may have the same value of "/sdcard/temp/video1.mp4", and location information in a source file corresponding to the frame 522 and the frame 523 may have the same value of "Brooklyn, N.Y." However, the image descriptors, the PTSs, and the PTSs in the source file may have different values respectively. For example, the frame 522 may be played at a time of 00:00:05 in the edited video 520, but the frame of the source video 512 corresponding to the frame 522 may be played at a time of 00:03:10 in the source video 512. The frame of the source video 512 corresponding to the frame 523 may be played at a time of 00:07:07 in the source video 512.

With the improvement in image/video acquisition functions of smart devices such as smartphones, tablets, or wearable devices, users may make records (pictures, videos, or the like) of various activities such as traveling, hiking, or a business trip using such smart devices. The users may reproduce one piece of content later by editing related pictures and videos. For example, the users may acquire videos in various places in vacation spots (e.g., Paris, Spain) using smartphones, and may generate edited videos for summarizing their vacation experiences using a plurality of acquired video files. However, for example, when an edited video is generated using a first video acquired on the 5th of October and a second video acquired on the 9th of October, there may be a time difference of up to four days between adjacent frames of the edited video, but it is not easy to recognize such a time difference. To recognize such a time difference, the users should check what videos have been used to generate the edited video and should check acquisition dates of checked videos (i.e., the first and second videos).

According to various embodiments of the present disclosure, the electronic device 100 may provide information of a source video while playing an edited video. For example, when a frame corresponding to the first video is played while the edited video is played, the electronic device 100 may provide information of an acquisition time and the first video. For example, when a currently played frame corresponds to 00:20:17 PTS of the first video, and the acquisition time of the first video is 10:30 AM on the 5th of October, the electronic device 100 may provide, to an arbitrary or a predetermined portion (e.g., a top right side or a bottom center) of the display 160, information of source content such as "first video, 10/5/2014 AM 10:30, 00:20:17". In some various embodiments of the present disclosure, the electronic device 100 may provide information such as "first video, 10/5/2014 AM 10:50:17" (information of a frame presented after elapse of 20 minutes and 17 seconds from the acquisition start time 10:30) using PTS information and acquisition (or generation) time information of a source video. In addition, the electronic device 100 may provide information such as "Paris, 10/5/2014 AM 10:50:17" using location information of the first video. Furthermore, information of time may be provided after being modified so as to correspond to the edited video according to a change in the PTS of the source video. Thereafter, if the electronic device 100 starts to play a frame corresponding to the second video (e.g., acquired on the 9th of October in Spain) in the edited video, the electronic device 100 may provide information such as "Spain, 10/9/2014 PM 04:09:11" by referring to the matching information. That is, according to various embodiments of the present disclosure, the electronic device 100 may generate a highlight video using a plurality of different contents, and may provide information of source content for the generated highlight video.

Figure 6:
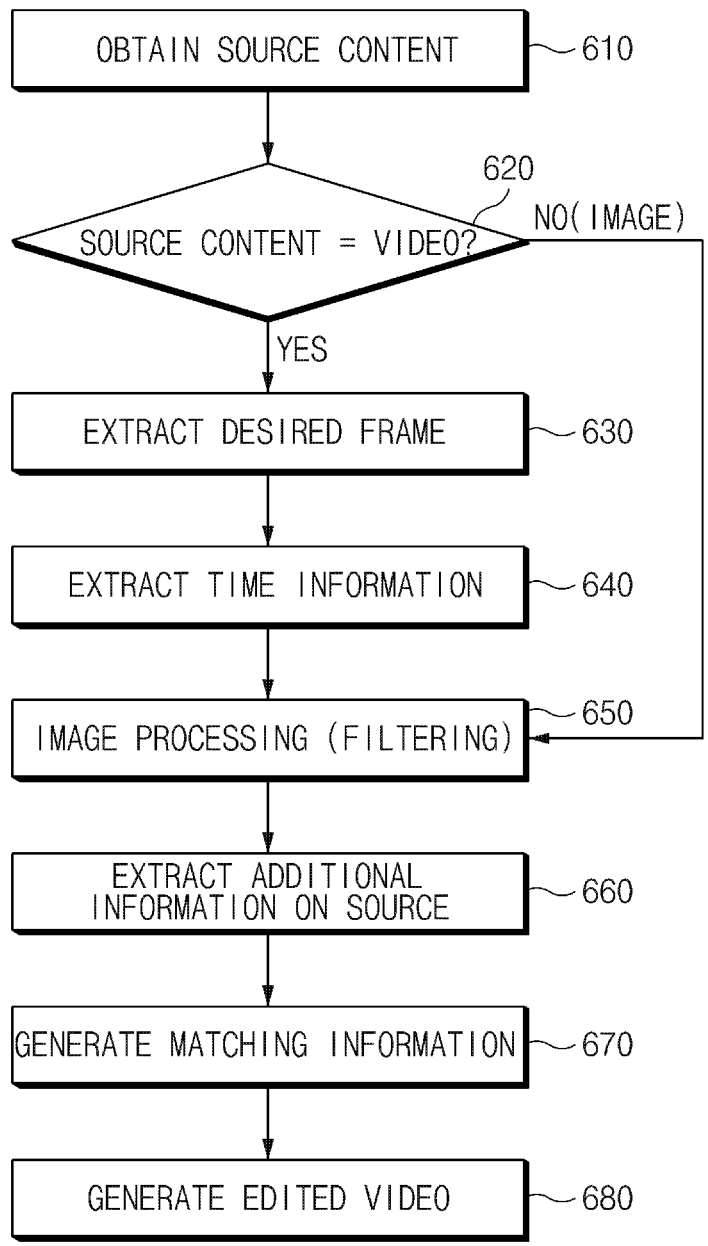
FIG. 6 illustrates a method for generating an edited video according to various embodiments of the present disclosure.

FIG. 6 illustrates a flowchart for generating an edited video according to various embodiments of the present disclosure. The flowchart of FIG. 6 is merely an example, and the above-mentioned operations or the operations described below may be added as appropriate, or some of the operations of the flowchart may be omitted or the sequence thereof may be changed.

In operation 610, the electronic device 100 may obtain source content. The source content may be stored in the memory 140 of the electronic device 100 of FIG. 1, or may be stored in devices, such as, for example, the first electronic device 102, the second electronic device 104, and the server 106, of FIG. 1. For example, the electronic device 100 may obtain the source content from a content providing server such as YouTube, or may obtain the source content from a could server such as Google Drive.

In operation 620, the electronic device 100 may determine whether the obtained source content is a video type. If the source content is the video type, the electronic device 100 may extract desired frames or key frames in operation 630. Here, the desired frames or the key frames represent frames that satisfy a condition for being used to generate an edited video, and are not limited by their names. For example, the desired frames may represent the I-frames in some various embodiments of the present disclosure, but may also represent frames that enable face recognition or object analysis in other embodiments of the present disclosure. In still other embodiments of the present disclosure, the key frames may represent frames corresponding to an interval arbitrarily set by a user.

In operation 640, the electronic device 100 may extract information of time from the extracted frames. For example, the electronic device 100 may extract information of time from a segment to which the extracted frames belongs. In various embodiments of the present disclosure, the information of time extracted in operation 640 may be information of the PTSs of the extracted frames in source content. In various embodiments of the present disclosure, operations 630 and 640 may be performed simultaneously or in parallel.

In operation 650, the electronic device 100 may perform image processing (e.g., filtering) on the extracted frames. When the source content is not the video type (i.e., image-type source content) in operation 620, operation 650 may be immediately performed on this source content. As a result of the filtering in operation 650, images determined to be inappropriate to generate the edited video (i.e., images that do not meet a standard for generating the edited video) may be removed.

In operation 660, the electronic device 100 may extract additional information of the source content. For example, as a result of the filtering in operation 650, the electronic device 100 may extract various additional information such as a file name of source content corresponding to finally selected images, a file path (a device where a file is located), a file size, a resolution, a duration (for a video), an acquisition (or generation) time, an acquisition (or generation) place, or the like.

In operation 670, with respect to the images selected in operation 650, the electronic device 100 may generate matching information between the edited video and the source content based on the information obtained in operations 640 and 660.

In operation 680, the electronic device 100 may generate the edited video using the matching information generated in operation 670 and the images (or frames) determined in operation 650. For example, the electronic device 100 may generate an edited video file having a structure in which edited video data generated by performing a multiplexing operation on the selected images is contained in a data area and the matching information is contained in a header area.

In various embodiments of the present disclosure, the operations of FIG. 6 may be performed by the video generating engine 210 of FIG. 2. A method for playing an edited video will be described with reference to FIGS. 7 to 10. The edited video described below may represent an edited video generated in the electronic device 100 using the method of FIG. 6 or may represent an edited video generated in a device different from the electronic device 100 and obtained by the electronic device 100. In case of the latter, the electronic device 100 may not be provided with the elements only included in the video generating engine 210.

Figure 7:
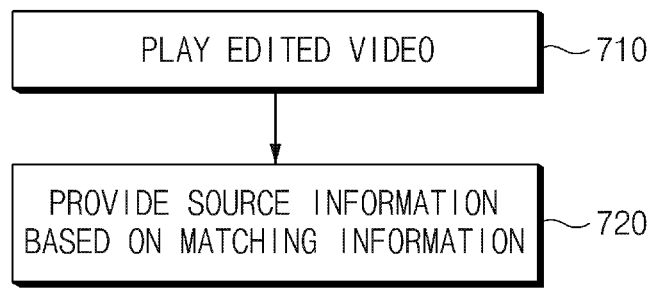
FIG. 7 illustrates a method for playing an edited video according to various embodiments of the present disclosure.

FIG. 7 illustrates a method for playing an edited video according to various embodiments of the present disclosure.

In operation 710, the electronic device 100 may play an edited video. Furthermore, the image processing module 130 of the electronic device 100 may play the edited video stored in the memory 140. Here, the edited video stored in the memory 140 may have been generated from a plurality of contents by the electronic device 100. In another embodiment, the electronic device 100 may play an edited video stored in an external server. In this case, the edited video stored in the external sever may have been generated from a plurality of contents, and may be buffered to the memory 140 so as to be played.

In operation 720, the electronic device 100 may provide information of the source content based on the matching information. For example, the edited video may include the matching information in a header area or a reserved area of an edited video file. The electronic device 100 may provide the information of the source content or the source content together with the edited video, using the matching information. A method for providing information of source content during playback of an edited video will be described with reference to FIG. 8.

Figure 8:
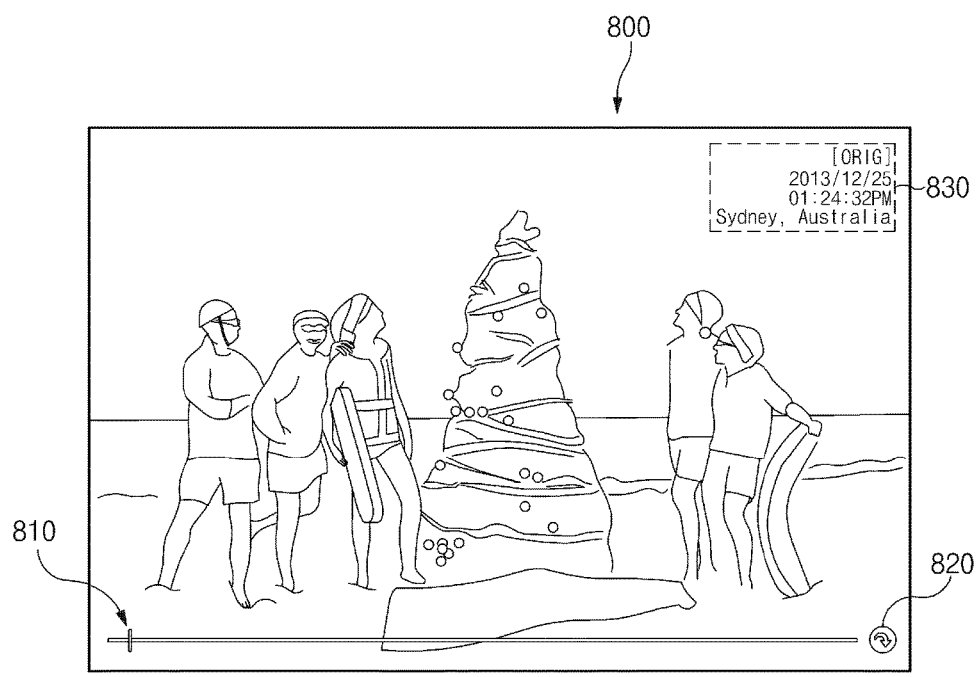
FIG. 8 illustrates a screen for providing information of source content during playback of an edited video according to various embodiments of the present disclosure.

FIG. 8 illustrates a screen for providing information of source content during playback of an edited video 800 according to various embodiments of the present disclosure.

Referring to FIG. 8, while the edited video 800 is played, information of the source content is displayed on an area 830 of the screen. For example, if a specific frame is output at a playback point 810 when the edited video is played, the information of the source content corresponding to the frame may be provided to the area 830. For example, a user may otherwise feel strange seeing an image of a person wearing a Santa Claus costume at the side of a Christmas tree against a summerly background. However, the edited video 800 also shows information that the source content of the image or video was acquired on Christmas day, 25th of December, 2013 in Sydney, Australia. In this way, the displayed information may assist with an understanding of the content.

In various embodiments of the present disclosure, when the source content is an image, an acquisition time may be output as information of time, and an acquisition place may be output as information of location. If the content corresponding to a currently played frame is a video, an acquisition time and a playback time (PTS) may be output as the information of time, or a value calculated based on the acquisition time and the playback time as described above with reference to FIG. 5 may be output as the information of time.

In various embodiments of the present disclosure, information of the acquisition time or acquisition place of the source content may be provided in association with another application over a portion or the entire playback duration of the edited video. A corresponding example will be described with reference to FIG. 12.

Furthermore, if an object (e.g., a source content connection object) that causes playback of the source content is selected while the edited video 800 is played, the electronic device 100 may display the source content on at least a part of the display 160. A method for playing source content in an edited video will be described with reference to FIG. 9.

Figure 9:
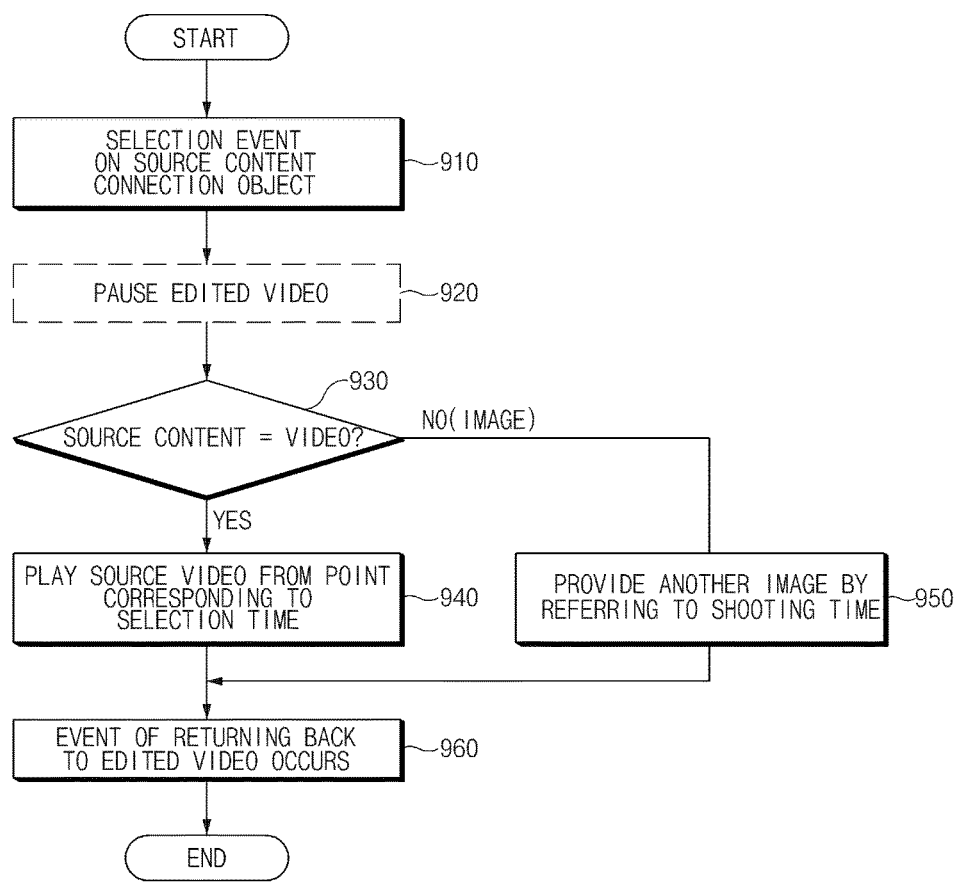
FIG. 9 illustrates a method for outputting source content to an edited video according to various embodiments of the present disclosure.

FIG. 9 illustrates a method for outputting source content to an edited video according to various embodiments of the present disclosure.

Referring to FIG. 9, a selection event on a source content connection object may occur in operation 910. Operation 910 may be performed following operation 710 or 720 of FIG. 7. For example, in the case of the configuration in which information of source content is automatically output to a partial area of an edited video when the edited video is played as described above with reference to FIG. 8, operation 910 may be performed following operation 720. However, in another embodiment of the present disclosure, when information of source content is not automatically displayed when an edited video is played, operation 910 may be performed following operation 710.

In operation 910, the selection event may occur in various ways. For example, when a touch or hovering input to an object (e.g., the area 830) is received or sensed through the input/output interface 150, the selection event on the source content may be considered to have occurred. However, in various embodiments of the present disclosure, the electronic device 100 may allow a user to perform specified input (e.g., a long touch on a playback screen or selection from a menu) without providing a specific object (e.g., a button) at the time of playback of the edited video, so that occurrence of such an input may be treated as occurrence of the same operation as operation 910.

In operation 920, the edited video may be paused in order to display the source content. However, in some various embodiments of the present disclosure, the source content may be played without pausing the edited video. In various embodiments of the present disclosure, the source content may be played at a normal speed, and the edited video may be played at a low speed (e.g., half speed). Furthermore, in various embodiments of the present disclosure, the edited video may be played together with a source video with respect to a common part therebetween, but the playback may be stopped if there is no part corresponding to the source video. For example, when frames 1 to 70 of the edited video, among frames 1 to 100 of the edited video, match a first source video (e.g., frames 71 to 100 match a second source video), if operation 910 occurs at a time of the frame 30, the electronic device 100 may play the edited video together with (in synchronization with) the first source video, but, from a time of the frame 71, the playback of the edited video may be stopped and the first source video may continue to be played.

When the source content corresponding to a frame of the edited video being played at the moment of the occurrence of the event is a video in operation 930, the electronic device 100 may start to play the source content at a point (e.g., the PTS of the source video corresponding to the frame 30 in the above-mentioned example) corresponding to the moment of object selection in operation 940. In various embodiments of the present disclosure, the electronic device 100 may provide the source content so that a source video not contained in the edited video may be checked. If the source content is not stored in an internal memory (e.g., the memory 140) of the electronic device 100, the electronic device 100 may refer to source file information (e.g., a file path) contained in the matching information so as to download the source content from an external device/server and play the downloaded source content.

If the source content corresponding to the frame of the edited video being played at the moment of the occurrence of the event is an image, the electronic device 100 may refer to an acquisition time of the image and may provide another image with a different acquisition time in operation 950. For example, the electronic device 100 may provide a gallery of images acquired at the same date as an acquisition date of the image. Alternatively, the electronic device 100 may provide a gallery of images acquired within one week from the acquisition date.

If an event of returning back to the edited video occurs in operation 960, the electronic device 100 may finish displaying of the source content and may resume playback of the edited video. For example, if operation 960 occurs, the electronic device 100 may return back to operation 710 or operation 720.

Figure 10:
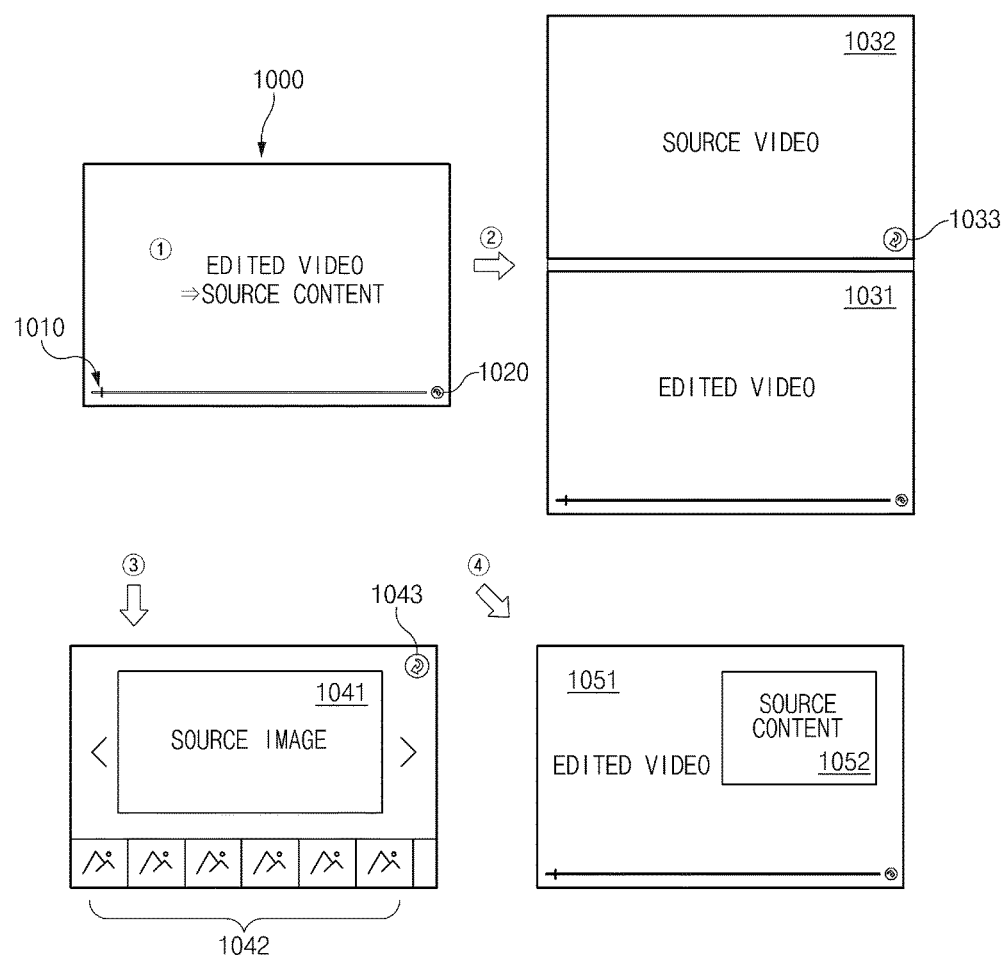
FIG. 10 illustrates an exemplary screen configuration for providing source content during playback of an edited video according to various embodiments of the present disclosure.

FIG. 10 illustrates an exemplary screen configuration for providing source content during playback of an edited video according to various embodiments of the present disclosure.

For example, if an object 1020 for displaying of source content is selected in a selection event, while an edited video 1000 is played on the display 160 of the electronic device 100, the electronic device 100 may replace an area where the edited video 1000 is displayed with that for the source content. In this case, the playback of the edited video may be paused (e.g., operation 920), and then may be resumed at a time of switching from the source content to the edited video (e.g., operation 960).

For another example, the electronic device 100 may divide the display 160 into a first screen and a second screen and may display a source video 1032 on the second screen while displaying an edited video 1031 on the first screen. If an object 1033 for returning back to the edited video is selected in this state, the electronic device 100 may return back to a previous state in which the edited video is played.

For another example, while displaying an image 1041 corresponding to a frame of a time of occurrence of the event, the electronic device 100 may provide an image 1042 of which an acquisition time approximates to that of the source image (e.g., acquired at the same date as the source image, or acquired within a predetermined time from the acquisition time of the source image). The electronic device 100 may display an image 1042 other than the image 1041 on a main area (e.g., an area where the image 1041 is displayed) or in full screen in response to a scroll input, a touch input, or the like. If an object 1043 for returning back to the edited video is selected in this state, the electronic device 100 may return back to a previous state in which the edited video is played.

For another example, the electronic device 100 may play source content 1052 while overlaying the source content 1052 on an area where an edited video 1051 is played. An area where the source content 1052 is played may be floated so as to be moved over the area of the edited video 1051.

The above-mentioned examples are provided only to describe various methods for displaying source content while an edited video is played, and are not intended to limit the methods. Those skilled in the art may make various modifications to the above-mentioned examples.

Figure 11:
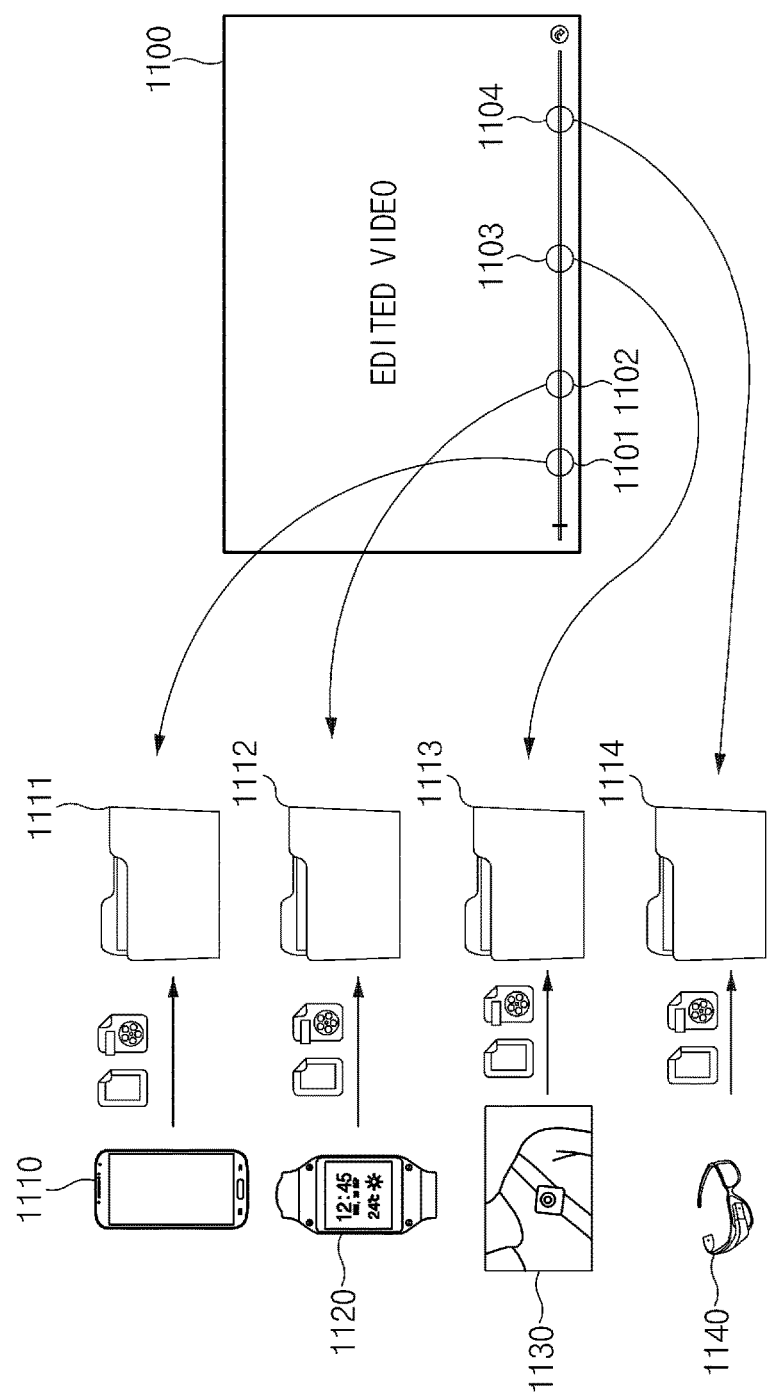
FIG. 11 illustrates an example of generating an edited video from source content stored in different electronic devices and accessing the source content stored in the different electronic devices through the edited video according to various embodiments of the present disclosure.

FIG. 11 illustrates an example of generating an edited video from source content stored in different electronic devices and accessing the source content stored in the different electronic devices through the edited video according to various embodiments of the present disclosure.

Referring to FIG. 11, source content for generating an edited video may be acquired by various devices. For example, various contents may be acquired by various wearable devices such as a smartphone 1110, a smartwatch 1120, a mount-type camera 1130, or smartglasses 1140. For example, a user may perform various activities such as skiing, cycling, or paragliding while carrying the smartphone 1110 and wearing the smartwatch 1120, the mount-type camera 1130, and the smartglasses 1140. Cameras installed in such various devices may acquire images from different viewpoints, and an edited video may be generated using content acquired in this manner.

In various embodiments of the present disclosure, source content may be stored in different folders of acquisition devices. For example, content acquired by the smartphone 1110 may be stored in a folder 1111, content acquired by the smartwatch 1120 may be stored in a folder 1112, content acquired by the mount-type camera 1130 may be stored in a folder 1113, and content acquired by the smartglasses 1140 may be stored in a folder 1114. The folders may exist in internal memories of respective devices. Meanwhile, in various embodiments of the present disclosure, the folders may exist in a memory of any one of the smartphone 1110, the smartwatch 1120, the mount-type camera 1130, and the smartglasses 1140. Alternatively, the folders may exist in a cloud server corresponding to a user account connecting the smartphone 1110, the smartwatch 1120, the mount-type camera 1130, and the smartglasses 1140.

In various embodiments of the present disclosure, if a function of jumping or skipping to source content is performed (e.g., selection of a source content connection object) at a specific time while an edited video 1100 is played, the electronic device 100 may access a corresponding folder and may play the source content. When the folder exists outside the electronic device 100, the electronic device 100 may establish a required network connection (e.g., a Bluetooth (BT) connection, a Wi-Fi direct connection, a cellular network connection, or the like) via the communication interface 170, may download the source content, and may display (or play) the source content. For example, at a playback point 1101, the electronic device 100 may obtain the source content acquired by the smartphone 1110 from the folder 1111. Likewise, at playback points 1102, 1103, and 1104, the electronic device 100 may download the source content from respective folders corresponding to the smartwatch 1120, the mount-type camera 1130, and the smartglasses 1140, and may display the downloaded content.

As described above, in various embodiments of the present disclosure, the electronic device 100 may access the source content corresponding to respective frames and may display the source content on a predetermined area (e.g., a top right side) of the edited video 1100, while playing the edited video 1100. For example, if hovering is performed with a user's finger or an electronic pen (e.g., S-pen, stylus, or the like), the source content may be overlaid and displayed while the hovering is maintained.

Figure 12:
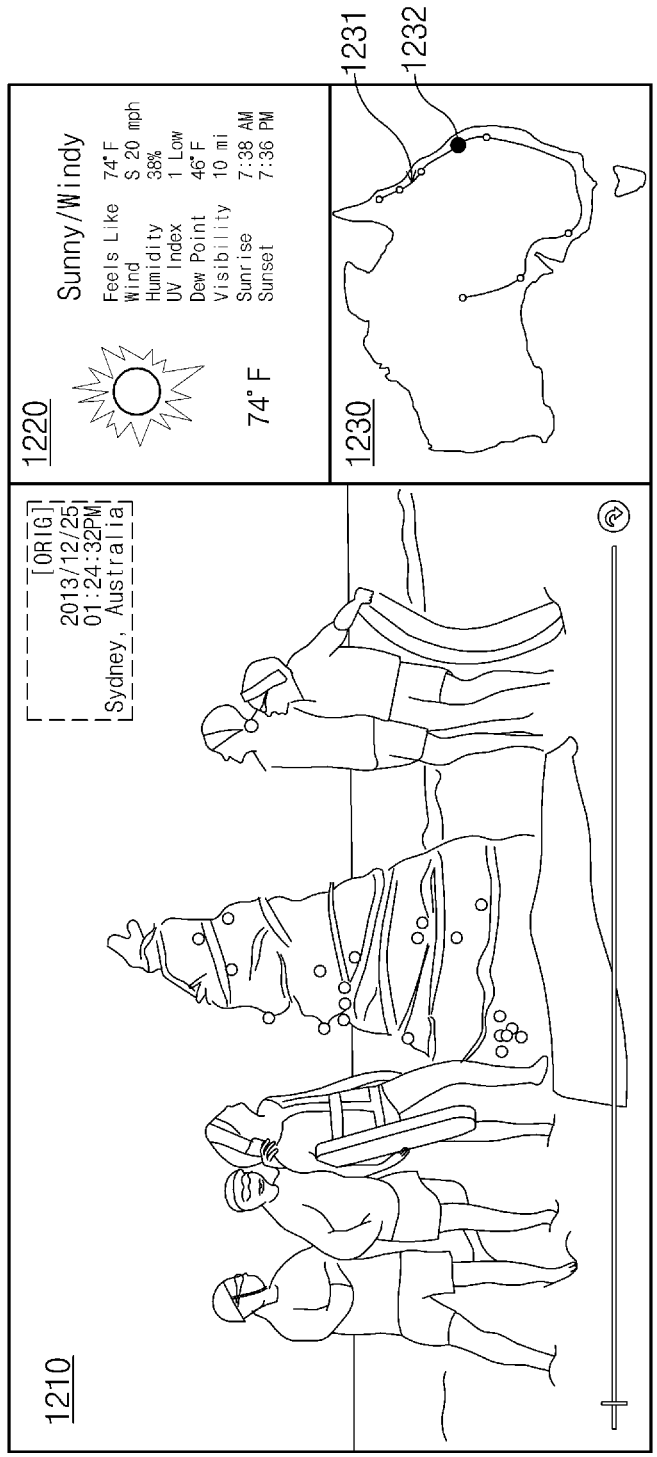
FIG. 12 illustrates an example of providing information of an edited video using an application according to various embodiments of the present disclosure.

FIG. 12 illustrates an example of providing information of an edited video using an application according to various embodiments of the present disclosure.

Referring to FIG. 12, an edited video may be displayed on an area 1210. For example, the edited video described above with reference to FIG. 8 may be displayed on the area 1210. While displaying the edited video on the area 1210, the electronic device 100 may provide the matching information contained in the edited video to a specified application. For example, the electronic device 100 may provide information of time and location contained in the matching information to a weather application. The electronic device 100 may display, on an area 1220, weather information corresponding to the time and location through the weather application. In this manner, weather information of a situation in which currently displayed images (or a video) of the edited video were acquired may be provided.

For another example, the electronic device 100 may provide information of time and location contained in the matching information to a map application. The electronic device 100 may provide, to another area 1230, moving route information associated with the edited video through the map application. For example, the electronic device 100 may display a moving route 1231 on a map by connecting locations corresponding to respective frames of the edited video in order of acquisition time, and may display a location 1232 corresponding to a currently output frame. In this manner, the electronic device 100 may intuitively show where a place in the edited video currently displayed is geographically located.

The screen configuration shown in FIG. 12 is merely an example, and the areas 1220 and 1230 may be located within the area 1210 to which the edited video is output, instead of being located outside the area 1210. Furthermore, only one of the areas 1220 and 1230 may be output, or an additional area may be further output to provide additional information.

Figure 13:
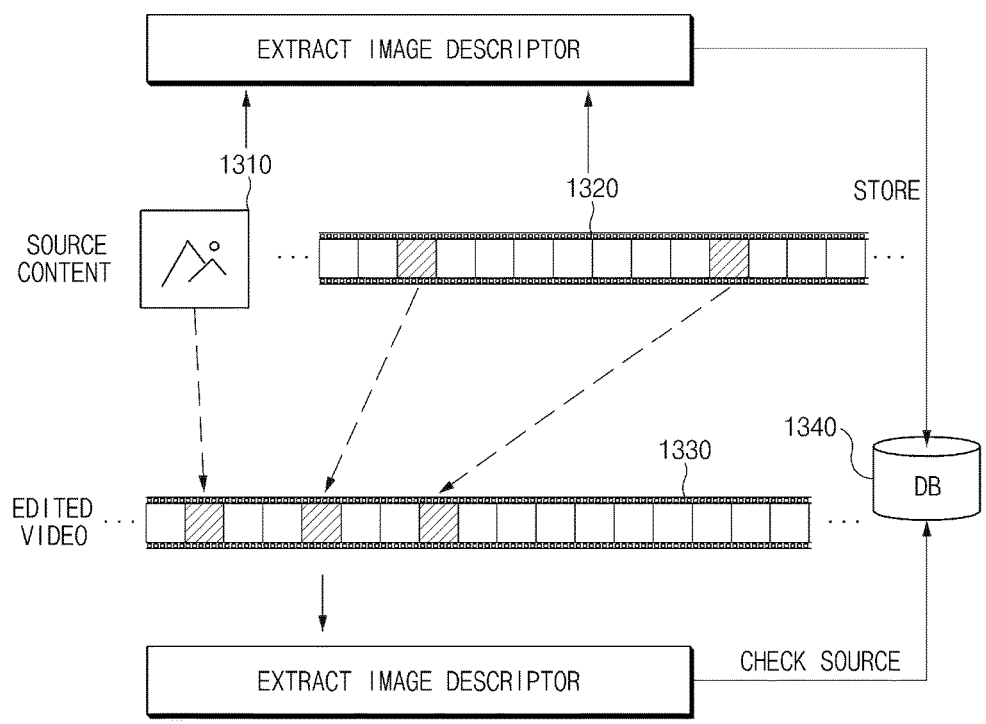
FIG. 13 illustrates a method for associating source content with an edited video based on an image descriptor according to various embodiments of the present disclosure.

FIG. 13 illustrates a method for associating source content with an edited video based on an image descriptor according to various embodiments of the present disclosure.

Referring to FIG. 13, the electronic device 100 may generate an edited video 1330 using source content, for example, an image 1310 and a video 1320. The electronic device 100 may extract an image feature from the source content. For example, the electronic device 100 may extract a feature vector by applying scale invariant feature transform (SIFT) to key frames (e.g., shaded frames of the video 1320) used for generating the edited video 1330. In various embodiments of the present disclosure, besides the SIFT, techniques such as histogram of oriented gradient (HOG), Haar feature, local binary pattern (LBP), speeded-up robust features (SURF), or the like may be applied. A specific value (e.g., a feature vector) calculated by each technique may be construed as an image descriptor.

The electronic device 100 may store an extracted image descriptor in an image descriptor database (DB) 1340. The image descriptor DB 1340 may be stored in the memory 140 of the electronic device 100, or may be located in a cloud server associated with the electronic device 100. In another embodiment of the present disclosure, the image descriptor DB 1340 may be located in a content providing server. When transmitting the image descriptor to a server, the electronic device 100 may transmit the matching information (e.g., metadata, file information, etc.) of the source image/video or a matching information structure (e.g., the matching information structure (or table) described above with reference to FIG. 5) together with the image descriptor.

In various embodiments of the present disclosure, when playing the edited video 1330, the electronic device 100 may extract an image descriptor from a key frame of the edited video 1330, and may request, from the image descriptor DB 1340, the matching information corresponding to the extracted image descriptor. The electronic device 100 may check source content or information corresponding to the source content from the matching information from the image descriptor DB 1340 which corresponds to the image descriptor extracted from the edited video 1330. The electronic device 100 may provide information of the source content as described above with reference to FIGS. 7 to 12, based on the checked source information.

In various embodiments of the present disclosure, an electronic device for generating the edited video 1330 may be different from an electronic device for playing the edited video 1330. For example, the edited video 1330 may be generated using a desktop computer, or may be generated by a content provider, for example, a server. For example, a user of an electronic device may play the edited video 1330 by accessing a website, and, in this case, the electronic device may receive source information checked using the image descriptor DB 1340 stored in a server. For example, even when the user views a highlight video generated by another user in a website such as YouTube or Facebook, the user may receive the source information of the highlight video.

Figure 14:
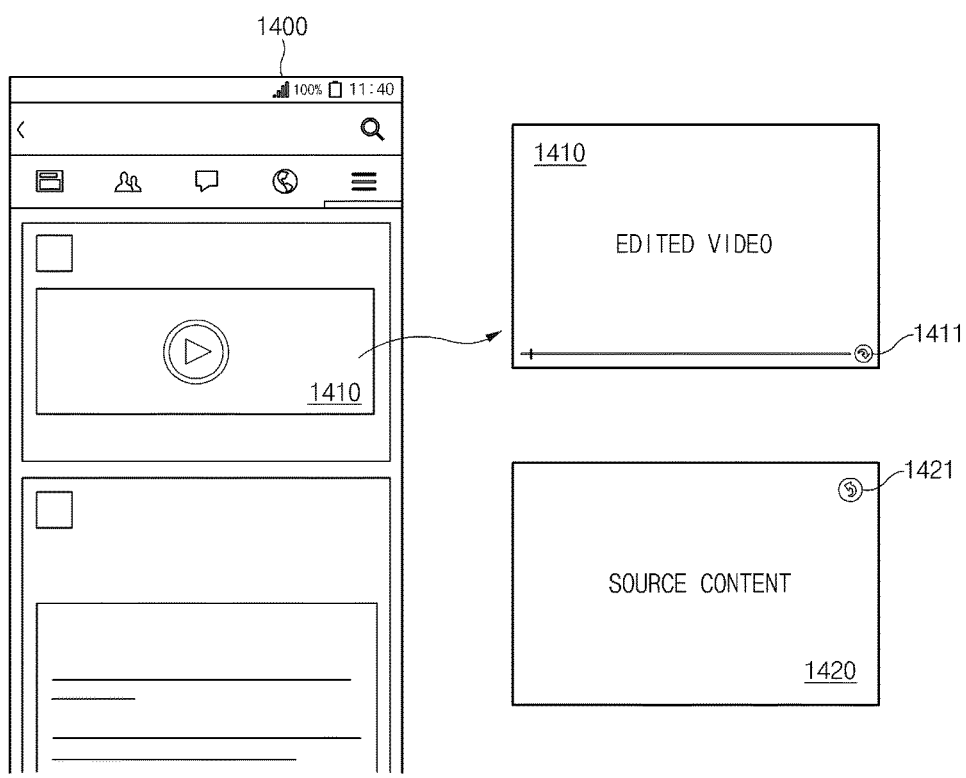
FIG. 14 illustrates an example of playing source content and an edited video provided from a website according to various embodiments of the present disclosure.

FIG. 14 illustrates an example of playing source content and an edited video provided from a website according to various embodiments of the present disclosure.

Referring to FIG. 14, the electronic device 100 may access a website (e.g., Facebook) and may play an edited video 1410. For example, the edited video 1410 may be played in a webpage on the electronic device 100, or may be played on the display 160 in full screen.

If an event of requesting displaying of source content (e.g., a selection event on a source content connection object 1411) occurs while the edited video 1410 is played, a corresponding website server may access a path of the source content based on the matching information contained in the edited video 1410 so as to allow source content 1420 to be played. For example, even if the source content exists in another website, the source content may be obtained by referring to path information of the source content unless the source content is inaccessible for security reasons. If an event that causes returning back to the edited video 1410 (e.g., a selection event on a back button 1421) occurs while the source content 1420 is played, the playback of the edited video 1410 may be resumed.

According to various embodiments of the present disclosure, elements of the electronic device 100 should be understood based on functions performed by respective elements, without being limited by the names of the elements. For example, the electronic device 100 may be construed as including an AP for controlling the elements of the electronic device 100 and video generation/playback, a CP for performing a communication function, and a memory for storing content. For another example, the electronic device 100 may include a CPU for controlling overall operation of the electronic device 100, a graphics processing unit (GPU) for performing image processing and displaying, a radio frequency integrated circuit (RFIC) for performing a communication function, and a storage. For another example, the electronic device 100 may be construed as including a control module, an image processing module, a storage module, an output module, and a communication module.

At least a part of devices (e.g., modules or functions thereof) or methods (e.g., operations) according to various embodiments of the present disclosure may be implemented as instructions stored in a computer-readable storage medium in the form of a program module. When the instructions are performed by a processor (e.g., the control module 120), the processor may perform functions corresponding to the instructions. The computer-readable storage medium may be, for example, the memory 140.

The module or program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various embodiments of the present disclosure, an edited video associated with a plurality of contents may be generated using the plurality of contents, and, when the edited video is played, the source content itself or information related to the source content may be provided.

According to various embodiments of the present disclosure, when the edited video is played, information of the source content may be provided together with the edited video, or the source content itself may be provided in response to a specified event. Furthermore, the source content may be provided while a specified input such as a hovering input occurs.

The above embodiments of the present disclosure are illustrative and not limitative. Various alternatives and equivalents are possible. Other additions, subtractions, or modifications are obvious in view of the present disclosure and are intended to fall within the scope of the appended claims.

What is claimed is:

1. An electronic device comprising:
   a display;
   a processor; and
   a memory configured to store instructions;
   wherein the processor is configured to execute the stored instructions to:
      play an edited video generated from a plurality of contents on the display;
      display matching information between the edited video and the plurality of contents with the edited video on the display;
      receive a request for source content corresponding to a frame being currently played; and
      in response to the request, pause the playing of the edited video and provide the source content from among the plurality of contents.

2. The electronic device of claim 1, wherein the processor is further configured to cause the display to display, on a partial area in the edited video, information of the source content matched to the frame being played.

3. The electronic device of claim 2, wherein the processor is further configured to cause the display to display, on the partial area in the edited video, information of at least one of a time and a location at which the source content is acquired.

4. The electronic device of claim 2, wherein, when the source content is a video, the processor is further configured to cause the display to display, on the partial area in the edited video, time information to which a PTS of a frame of the video corresponding to the frame being played is applied with respect to an acquisition time of the video.

5. The electronic device of claim 1, wherein, when the source content is an image, the processor is further configured to cause the display to display another image acquired within a time from an acquisition time of the image together with the source content.

6. The electronic device of claim 1, wherein, when the source content is a video, the processor causes the display to play the video from a time corresponding to a frame of a time at which a source content connection object is selected.

7. The electronic device of claim 1, wherein the processor is further configured to cause the display to display an object or a function for finishing displaying of the source content and returning back to playback of the edited video.

8. The electronic device of claim 1, wherein the processor is further configured to cause the display to display the source content on an area where the edited video is played, or to divide the display of the electronic device and to display the edited video and the source content on different areas respectively, or to display the source content while overlaying the source content over the edited video.

9. The electronic device of claim 1, wherein the processor is further configured to cause the display to provide information of time or location contained in the matching information to a specified application, and to display the provided information through the specified application.

10. The electronic device of claim 9, wherein the processor is further configured to cause the display to display, based on the matching information, information of a device or a location in which the plurality of contents are stored.

11. A method for playing a video, the method comprising:
playing an edited video generated from a plurality of contents on a display;
displaying matching information between the edited video and the plurality of contents with the edited video on the display;
receiving a request for source content corresponding to a frame being currently played; and
in response to the request, pausing the playing of the edited video and providing the source content from among the plurality of contents based on the matching information.

* * * * *